US009635543B2

(12) United States Patent
Meurisse

(10) Patent No.: US 9,635,543 B2
(45) Date of Patent: Apr. 25, 2017

(54) NEGOTIATION METHOD FOR PROVIDING A SERVICE TO A TERMINAL

(75) Inventor: Jean-Sébastien Meurisse, Louannec (FR)

(73) Assignee: FRANCE TELECOM, Paris (FR)

( * ) Notice: Subject to any disclaimer, the term of this patent is extended or adjusted under 35 U.S.C. 154(b) by 187 days.

(21) Appl. No.: 13/262,378

(22) PCT Filed: Mar. 22, 2010

(86) PCT No.: PCT/FR2010/050513
§ 371 (c)(1),
(2), (4) Date: Mar. 13, 2012

(87) PCT Pub. No.: WO2010/112729
PCT Pub. Date: Oct. 7, 2010

(65) Prior Publication Data
US 2012/0023197 A1  Jan. 26, 2012

(30) Foreign Application Priority Data
Mar. 30, 2009 (FR) ...................... 09 51988

(51) Int. Cl.
*G06F 15/16* (2006.01)
*H04W 8/22* (2009.01)
(Continued)

(52) U.S. Cl.
CPC ................ *H04W 8/22* (2013.01); *G06F 3/01* (2013.01); *G06F 3/02* (2013.01); *H04M 1/7258* (2013.01);
(Continued)

(58) Field of Classification Search
CPC ......... H04W 4/18; H04W 4/185; H04W 8/22; H04W 8/24; H04M 1/7258; G06F 3/01; G06F 3/02
(Continued)

(56) References Cited

U.S. PATENT DOCUMENTS 6,104,924 A * 8/2000 Shirai ............... H04M 1/72525
455/418
6,301,626 B1 * 10/2001 Knox .................... G06F 3/0238
400/89
(Continued)

FOREIGN PATENT DOCUMENTS

| EP | 1724984 A1 | 11/2006 |
| GB | 2434721 B | 7/2008 |
| WO | 0243422 A1 | 5/2002 |

OTHER PUBLICATIONS

English Translation of the International Search Report and Written Opinion dated Aug. 9, 2010 for the corresponding International Application No. PCT/FR2010/050513, filed Mar. 22, 2010.

*Primary Examiner* — James Conaway
(74) *Attorney, Agent, or Firm* — David D. Brush; Westman Champlin & Koehler, P.A.

(57) ABSTRACT

A negotiation method and server are provided for delivery of a service to a terminal. Also provided are a method for configuring a terminal and a terminal using the method. In particular, the methods and apparatus relate to interfaces for interaction with services available to users of a service. The negotiation method includes sending to the terminal of a set of proposals for interactions with a delivery component of the service capable of enabling the terminal to indicate to the delivery component that the terminal accepts at least one proposal from the set of interaction proposals.

9 Claims, 3 Drawing Sheets

(51) Int. Cl.
- *G06F 3/02* (2006.01)
- *H04M 1/725* (2006.01)
- *G06F 3/01* (2006.01)
- *H04W 4/18* (2009.01)
- *H04W 8/24* (2009.01)

(52) U.S. Cl.
CPC .............. *H04W 4/18* (2013.01); *H04W 4/185* (2013.01); *H04W 8/24* (2013.01)

(58) Field of Classification Search
USPC .................................................. 709/217, 228
See application file for complete search history.

(56) References Cited

U.S. PATENT DOCUMENTS

| | | | |
|---|---|---|---|
| 6,708,214 B1* | 3/2004 | La Fleur | G06F 17/30899 707/999.006 |
| 6,826,413 B1* | 11/2004 | Nakatsuchi | H04M 1/72525 455/553.1 |
| 8,406,409 B2* | 3/2013 | Smith et al. | 379/210.02 |
| 8,542,323 B2* | 9/2013 | Hardacker et al. | 348/734 |
| 8,561,124 B2* | 10/2013 | Sakao et al. | 725/146 |
| 2002/0075300 A1 | 6/2002 | Tang | G06F 9/4443 715/744 |
| 2003/0023953 A1* | 1/2003 | Lucassen | G06F 8/38 717/106 |
| 2003/0129976 A1* | 7/2003 | Yoshikawa | G06F 1/1626 455/419 |
| 2003/0151538 A1* | 8/2003 | Escobosa | G06F 8/65 341/176 |
| 2004/0203759 A1 | 10/2004 | Shaw et al. | |
| 2005/0055702 A1* | 3/2005 | Kopp | H04W 4/001 719/320 |
| 2005/0123118 A1* | 6/2005 | Terry et al. | 379/211.02 |
| 2006/0242600 A1* | 10/2006 | Pradhan et al. | 715/831 |
| 2007/0082708 A1* | 4/2007 | Griffin | 455/565 |
| 2007/0205909 A1* | 9/2007 | Kung | H04L 12/2814 340/4.32 |
| 2008/0123687 A1* | 5/2008 | Bangalore | H04L 65/104 370/467 |
| 2008/0165035 A1* | 7/2008 | Bhella et al. | 341/23 |
| 2008/0191899 A1* | 8/2008 | Lee | G06Q 30/0601 340/4.31 |
| 2008/0211698 A1* | 9/2008 | Zach | G06F 3/0221 341/23 |
| 2008/0276182 A1* | 11/2008 | Leow | 715/740 |
| 2008/0313566 A1* | 12/2008 | Barnum | G06F 3/0482 715/825 |
| 2009/0254634 A1* | 10/2009 | McKinney et al. | 709/219 |
| 2009/0270078 A1* | 10/2009 | Nam et al. | 455/414.1 |
| 2009/0292375 A1* | 11/2009 | Thompson | G08C 17/00 700/81 |
| 2010/0020956 A1* | 1/2010 | Gorti | H04L 12/2814 379/207.02 |
| 2010/0313169 A1* | 12/2010 | Huang | G06F 3/0481 715/835 |
| 2011/0202342 A1* | 8/2011 | He | G10L 15/22 704/251 |
| 2012/0106725 A1* | 5/2012 | Smith et al. | 379/201.02 |
| 2012/0244952 A1* | 9/2012 | Patil | A63F 13/06 463/42 |
| 2012/0311457 A1* | 12/2012 | O'Gorman | G06F 9/4445 715/740 |
| 2013/0127726 A1* | 5/2013 | Song | G06F 3/01 345/168 |

\* cited by examiner

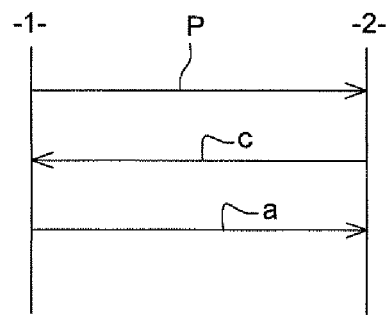
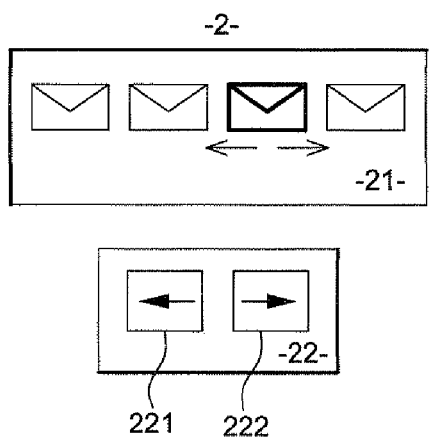
Fig. 2a
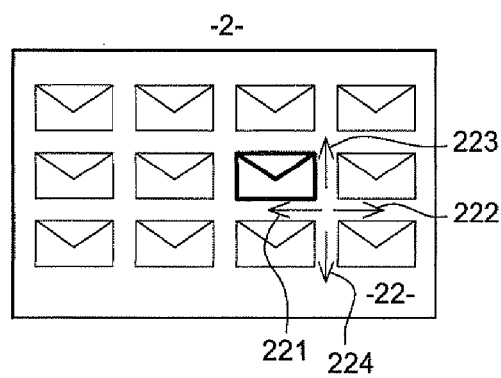
Fig. 2b
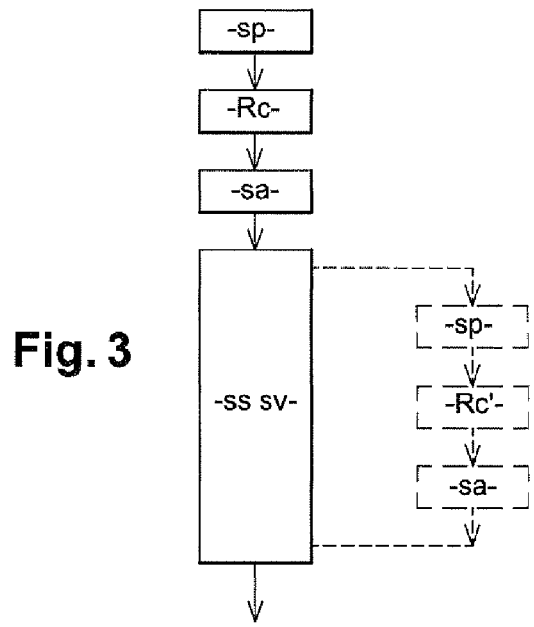
Fig. 3

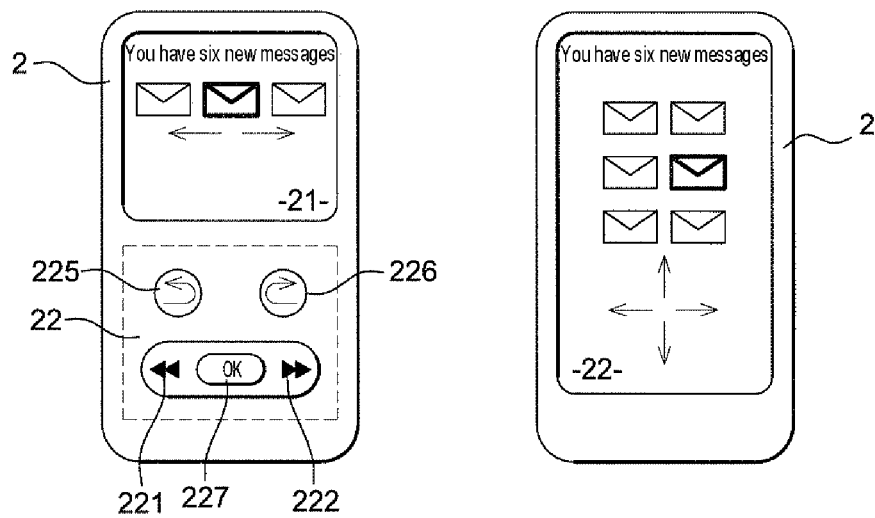
Fig. 4a Fig. 4b
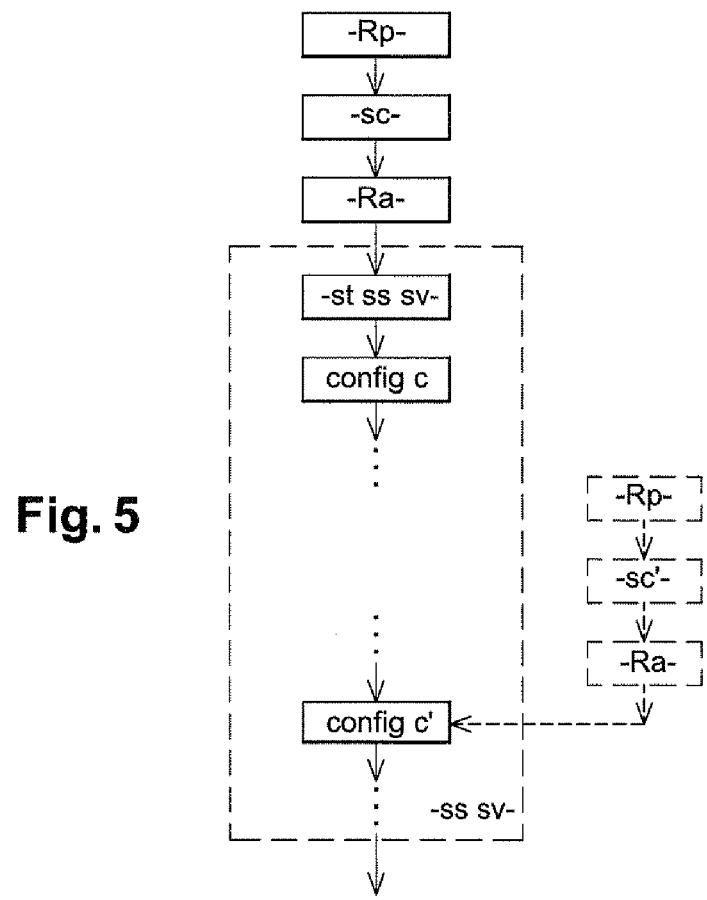
Fig. 5

NEGOTIATION METHOD FOR PROVIDING A SERVICE TO A TERMINAL

CROSS-REFERENCE TO RELATED APPLICATIONS

This Application is a Section 371 National Stage Application of International Application No. PCT/FR2010/050513, filed Mar. 22, 2010 and published as WO 2010/112729 on Oct. 7, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to a negotiation method for the delivery of a service to a terminal, a server using said method, a method for configuring a terminal, and a terminal using said method. In particular, the disclosure relates to the interfaces for interaction with services available to users of a service.

BACKGROUND OF THE DISCLOSURE

In the field of the current interfaces, two different trends are apparent.

On the one hand, rich and sophisticated interfaces are being developed that rely on the precise knowledge of the terminal accessing the service. These are so-called "closed" environments. Such is the case, for example, for services or applications dedicated to the iPhone, television offerings based on receivers or boxes which are clearly known, and so on.

This first approach requires, in particular, the users to invest in a full, and often proprietary, solution.

On the other hand, conversely, in a desire to make access to the resources of the Internet universally available, web browsers have emerged. These are so-called "open" environments. So as to be accessible to a very large number of terminals, these browsers have remained highly independent of the capabilities of the terminal, since all that is needed is a pointing device (a mouse, in particular) to use a browser.

This second approach, through its attempt at genericity, is ill suited to the growing diversity of the types of terminals used to access a service, culminating in an under-use of the capabilities of the terminal or, on the other hand, in the failure to recognize its limitations.

Furthermore, this second approach is ill suited to the handicap of certain users.

Also, in addition, it does not take into account usage contexts, in particular the mobility of the terminal, the fact that a conversation is already in progress, etc. Now, these usage contexts could have been indicated by the user or been deduced from the configuration set up by the user on his or her terminal (terminal in "Meeting" mode, microphone deactivated, etc.).

A number of solutions now exist that make it possible to indicate to a terminal to indicate its hardware and software characteristics to a service or an application, such that the latter adapts its content and/or the presentation of its content on the terminal concerned.

In particular, the specifications RFC 2534 and 1999 provide for a terminal to be able to indicate information describing its capabilities concerning the display, printing and reception of faxes. However, because of its age, they are no longer suited to the current complexity of the applications and of the terminals.

In its recommendation CP/PP1.0 dated 15 Jan. 2004, of which version 2.0 is in the working document state, the W3C (World Wide Web Consortium) consortium is drawing up a standard enabling each terminal to describe its capabilities. These are essentially capabilities concerning the hardware, the operating system, the Web browser and, where appropriate, the type of network connectivity. The aim is to enable a Web server to adapt the content delivered and its formatting to the limitations of the terminal. This recommendation draws on the RDF (Resource Description Framework) standard, based on the XML language, to describe the capabilities of a terminal.

The OMA Alliance (Open Mobile Alliance) has adopted the recommendation of the W3C consortium to detail its modalities of use in the context of mobile terminals. These modalities of use essentially specify the use of the composite capabilities/preferences profiles CC/PP on session according to the WAP or WSP protocol (WSP standing for WAP session protocol) and on session according to the wireless http or W-http (standing for WAP Wireless profiled http) protocol in a ratified document entitled User Agent Profile version 2.0.

Now, all these solutions are essentially focused on the passive playback capabilities of the terminals such as the display possibilities, the presence of loudspeakers, etc., and partially on its capabilities to send information (texts, voice, etc.). In all these cases, the single and unique objective of such information is to enable the Web server to adapt the delivered content (Content Adaptation). This content adaptation is then performed either by the selection of a content having a suitable format (the same content being available in several formats), or by formatting of the content in a different manner according to the playback and/or sending capabilities indicated, or by transforming the content (notably by reducing resolution, transcoding, etc.).

The interactions of the terminal with the service remain limited either, in the first approach, to the one proposed by the proprietary interface solution with its drawbacks or, in the second approach, to the generic interactions.

In this second approach, the potentialities of the terminal are therefore not fully exploited because this approach levels down the interactions between the terminal and the services, leading to the underuse of the interaction capabilities of the terminal.

SUMMARY

One subject of an embodiment of the invention is a negotiation method for the delivery of a service to a terminal comprising the sending to said terminal of a set of proposals for interactions with means for delivery of said service capable of enabling said terminal to indicate to said means for delivery of said service that said terminal accepts at least one proposal from the set of interaction proposals.

Thus, the service proposes to the terminal alternatives in terms of possible interaction modes. The terminal can thus indicate the interaction mode(s) corresponding to the best possible use of its capabilities, or even choose an interaction mode that is compatible with the handicap of the user of said terminal.

Advantageously, the step for sending a set of interaction proposals is repeated during a session of said service.

Thus, if there has been an update to the service's interaction modes and/or to the terminal's interaction capabilities and/or if the user of the terminal has changed during the session, these new elements can be taken into account to readapt to the interaction mode of the terminal with the service.

Another subject of an embodiment of the invention is a program comprising program code instructions for executing the steps of the negotiation method when said program is executed by a processor.

The subject of an embodiment of the invention is a server delivering a service to a terminal comprising means for sending to said terminal a set of proposals for interactions with means for delivery of said service capable of enabling said terminal to indicate to the server that said terminal accepts at least one proposal from the set of interaction proposals.

Another subject of an embodiment of the invention is a method for configuring a terminal with a view to the delivery of a service comprising the reception of a set of proposals for interactions with means for delivery of said service capable of enabling said terminal to indicate to said means for delivery of said service that said terminal accepts at least one proposal from the set of interaction proposals.

Advantageously, said method comprises the choice of at least one proposal from the set of interaction proposals according to the capabilities of said terminal.

Thus, the terminal can be configured to interact best with the service according to its own capabilities.

Advantageously, said method comprises the repetition of the step for reception of a set of interaction proposals capable of enabling said terminal to modify the at least one accepted proposal.

Advantageously, on starting the use by said terminal of said service, said method comprises a configuration of said terminal according to one of the at least one accepted proposals.

Thus, the terminal dedicates its interface to interact with the service during the time that this service is used by the user of the terminal. The terminal dynamically adapts its interface to the service according to the interaction proposal set proposed by the service.

Another subject of an embodiment of the invention is a program comprising program code instructions for executing the steps of the configuration method when said program is executed by a processor.

A subject of an embodiment of the invention is a terminal comprising the reception of a set of proposals for interactions with means for delivery of a service capable of enabling said terminal to indicate to said means for delivery of said service that said terminal accepts at least one proposal from the set of interaction proposals.

Another subject of an embodiment of the invention is a terminal comprising means for delivery of a service and an interface enabling a user of said terminal to interact with said service, said means for delivery of said service comprises means for sending to said interface a set of proposals for interactions with said means for delivery of said service capable of enabling said interface to indicate to said means for delivery of said service that said interface accepts at least one proposal from the set of interaction proposals.

BRIEF DESCRIPTION OF THE DRAWINGS

The features and advantages of one or more embodiments of the invention will become more clearly apparent from reading the description, given as an example, and the figures relating thereto which represent:

FIG. 1, exchanges that take place during the negotiation method according to an embodiment of the invention, FIGS. 2a and 2b, diagrams of examples of interaction proposals, interactions respectively through the use of keys and through the use of a touchscreen, FIG. 3, a block diagram for a negotiation method according to an embodiment of the invention, FIGS. 4a and 4b, diagrams of examples of terminals configured according to the interaction proposed by, respectively, FIGS. 2a and 2b for the delivery of a messaging service, FIG. 5, a block diagram of a configuration method according to an embodiment of the invention, FIG. 6, a block diagram of an architecture implementing an embodiment of the invention.

DETAILED DESCRIPTION OF ILLUSTRATIVE EMBODIMENTS

Figure 6:
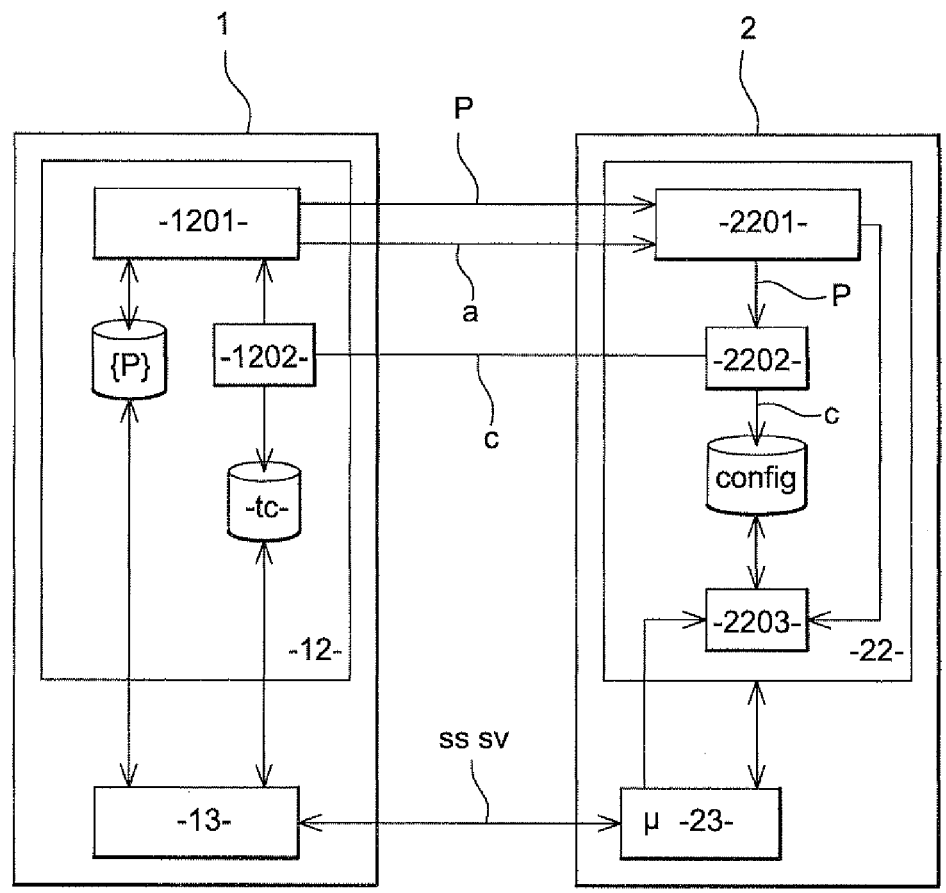

The variants of the invention described hereinbelow can be implemented alone or in combination.

FIG. 1 illustrates the exchanges that take place during the negotiation method illustrated by FIG. 4. The objective of the negotiation method is first of all to list a set of stimuli which can potentially be taken over by a terminal and means for delivery of a service, also called core application, during the service session.

The term "stimuli" should be understood to mean information passed form the terminal to the means for delivery of a service. The sending thereof is provoked by a usage action directed toward the means for delivery of a service. The stimulus is therefore an interaction between the terminal and the means for delivery of a service.

The term "service" designates both the service delivered by the core application and, in a misuse of language, can be used to designate this core application, that is to say, the means for delivery of the service. The means for delivery of a service may consist of a logic entity which delivers a service to the user. These means for delivery of a service may be local or remote, which means that the means for delivery of the service may be respectively located in the terminal or in a remote server. It is in these means for delivery of the service that the requests from the terminal are processed and that the content which is intended for said terminal is prepared according to these requests before being transmitted.

The negotiation comprises at least a first exchange p of the means for delivery of a service 1 to the terminal 2. In this exchange, the means for delivery of a service 1 formulate a set of interaction proposals. In a variant of the invention, the proposals are arranged hierarchically, notably according to the wealth of interactions that they offer to the user. Each proposal brings together a set of interactions taken over by the means for delivery of the service. The expression "set of interactions" is understood to mean at least one interaction. For each interaction or stimulus, the set of interaction proposals p sent by the means for delivery of a service 1 comprises:

a description of the interaction command that has to be sent by the terminal 2 to the means for delivery of a service 1 when the corresponding interaction is activated by the user, in a variant of the invention, the mandatory or optional nature of the interaction for the service, where appropriate, any other additional information which could prove useful in the use of the service (being able, for example, to be used to inform the user as to how to use his or her terminal to access the delivery means).

The first exchange therefore constitutes an offer to the terminal 2 of stimuli or interactions taken over by the means for delivery of a service 1.

The tables below give an example of a set of interaction proposals that can be sent by means for delivery of a service 1, in particular of an advanced voice messaging service, to a terminal 2, such as a mobile terminal.

| Proposal n° 1 | | Pref 9 |
|---|---|---|
| Stimulus | Associated command | O/F |
| * | DTMF "*" | O |
| 1 | DTMF "1" | O |
| 3 | DTMF "3" | O |
| 5 | DTMF "5" | O |

| Proposal n° 2 | | Pref 2 |
|---|---|---|
| Stimulus | Associated command | O/F |
| Right | Next | O |
| Left | Back | O |
| Confirm | OK | O |
| Return | Upper-Menu | O |
| C | Delete | F |

| Proposal n° 3 | | Pref 1 |
|---|---|---|
| Stimulus | Associated command | O/F |
| Scroll right | Roll-Next | O |
| Scroll left | Roll-Back | O |
| Scroll up | Roll-Up | O |
| Scroll down | Roll-Down | O |
| Point | Position | O |
| Select | Select | F |

In this example, the first proposal is the least recommended by the provider of the service (Pref=9).

The means for delivery of a service 1 can inform the terminal thereof by indicating, in the sending of a set p of interaction proposals, a preference indication. In the above example, this preference indication is given by a Pref parameter ranging from 1 to 10 from the most interesting proposal to the least interesting proposal according to the means for delivery of the service. The interest may be a simple recommendation from the provider of the service or be estimated by the means for delivery of the service 1. This interest is based on one more criteria such as the wealth of the interaction, the genericity of the interaction proposal, etc.

The first proposal enables the user of the terminal who will use this interaction mode to interact with his voice messaging service only by sending voice frequencies to the means for delivery of the service (DTMF keys). This proposal has the advantage of allowing the service to be accessed by the least sophisticated of terminals.

The second proposal enables the user to use the "right/left/confirm/return" keys of the keyboard 22 of a mobile terminal 2 illustrated by FIG. 2a, and, optionally, to use the "cancel" key (O/F field set to "F"). To implement this second interaction proposal the terminal must therefore configure these keys so that the commands are suitably associated to allow interaction with the means for delivery of the service.

In the case where the terminal 2 is configured according to this second proposal to interact with the means for delivery of the voice messaging service 1, the means for delivery of the voice messaging service will represent, for example in the form of a list of messages (here, of sealed envelopes) which will be displayed on the screen 21 of the mobile terminal 2 and which can be browsed through from right to left (arrows on the screen 21). The means for delivery of the service will not allow "up/down" browsing in this list. Thus, a user who is familiar with the terminal 2 will intuitively use the left key 221 and the right key 222 of the keyboard 22 of the mobile terminal 2 to browse through the list proposed by the means for delivery of the service.

The third proposal enables the user to use the touchscreen 22 of his mobile terminal 2 illustrated by FIG. 2b, allowing for movement in all directions (four arrows of the touchscreen 22), but also for an element to be pointed to and, if necessary, selected. The means for delivery of the voice messaging service can supply the messages in the form of a mosaic displayed on the touchscreen 22, as illustrated by FIG. 2b, that the user of the mobile terminal 2 can browse through in all directions. Optionally, the third proposal provides for a selection of a set of icons representing the messages on the touchscreen 22 by the user to generate a command to select the messages represented in this way, in order, for example, to carry out a common action on this group of messages (deleting them, moving them to a directory, etc.).

From the set p of the interaction proposals (illustrated by the above tables), the terminal 2 chooses one or more interaction proposals and indicates its choice, via the exchange c, to the means for delivery of the service 1. The possibility of accepting several proposals at a time enables the terminal 2 to enrich and diversify the interaction modes, and possibly to be adapted to its user. The means for delivery of the service 1 indicate, where appropriate, the acceptable proposal combinations, for example, in an additional parameter of the set p of interaction proposals.

The indication c of choice of proposal (choice of stimuli taken over) may be the fact that the terminal 2 does not support any of the proposed interaction modes. In this case, the indication c constitutes a notification of the fact that the terminal 2 does not satisfy the prerequisites allowing for the use of the service delivered by the means for delivery of the service 1.

In a variant of the invention, the means for delivery of the service 1 indicate, via the exchange a, that the choice of the terminal 2 has been taken into account. This message may, if necessary, be used to manage some, or even all, error cases.

FIG. 3 takes up the negotiation method implemented notably by the means for delivery of a service 1 or negotiation means (component) collaborating with these means for delivery of the service 1. The method comprises a sending sp of a set of interaction proposals with means for delivery of a service 1. Following this sending, the negotiation method comprises, if necessary, the reception rc by said means for delivery 1 of said service of an indication c that said terminal 2 accepts at least one proposal out of the set p of interaction proposals.

In a variant of the invention, the negotiation method comprises the sending sa of a confirmation of the stimuli taken over by the terminal. This confirmation makes it possible to check that the terminal 2 and the means for delivery of the service 1 will correctly use the same interaction proposals.

In a variant of the invention, a service session is opened ss sv and the negotiation method can be renewed one or more times during this service session as shown by the negotiation method illustrated by broken lines.

FIG. 5 illustrates a method for configuring a terminal 2. This method comprises the reception rp of a set of interaction proposals with means for delivery of a service 1. Following this sending, the configuration method comprises, if necessary, the sending sc to said means 1 for delivery of said service of an indication c that said terminal 2 accepts at least one proposal out of the set p of interaction proposals.

In a variant of the invention, the configuration method comprises the reception ra by delivery means of a confirmation of the stimuli taken over by the terminal 2.

In a variant of the invention, the configuration method comprises a dynamic configuration config c of the terminal 2 and in particular of these interaction means or interaction interface 22.

To carry out both the selection from the set p of interaction proposals and the dynamic configuration config c, a terminal 2 can use one or more of the following methods taken alone or in combination:
- a default configuration listing the interactions supported by the terminal and associating with each action of a user on said terminal (for example with each key of the terminal) an interaction command or stimulus. This configuration is, for example, notably set up by the manufacturer of the terminal and/or the distributor, etc. with, where appropriate, updates by conventional computing and electronic update procedures.

Thus, the choice of one or more proposals from the set p of interaction proposals will be dependent on this list of interactions supported by the terminal.
- a customized configuration, with the user of the terminal defining his preferences in terms of interaction: which key has which function, preference between the use of voice or keyboard commands, the use of the numeric keypad, etc. This configuration can be defined by the user via a startup assistant or by the input of parameters in a configuration menu, etc.

Thus, the choice of one or more proposals from the set p of interaction proposals will be dependent on the interaction parameters defined by the user and notably his preferences.
- a service-specific customized configuration, with the user of his terminal defining his preferences service by service (useful in the case of games for example).
- a profile activated on the terminal. From this profile, the terminal will deduce a certain number of determining constraints in the choice of one or more proposals from the set p of interaction proposals. For example, the "In meeting", "Away", and similar type profiles will make it possible for example for the terminal not to select the interaction proposals based on the voice mode (a user in a meeting preferring rather to interact by text mode than by speaking for example).

Once one or more proposals have been retained and this choice has been notified sc, the terminal is dynamically configured by assigning a command or function of the terminal to each stimulus or interaction.

In the case of the voice messaging service of FIG. 2a, the dynamic configuration of the terminal 2 according to the second proposal will result, as illustrated by FIG. 4a, in a terminal 2 whose keys allow access to the messaging functions. The messages are presented linearly on the screen 21 of the terminal because the terminal does not have "up" and "down" keys. The keys of the interaction interface 22 of the terminal 2 are configured as follows: key 221 provides access to the previous message, key 222 to the next message, key 227 opens the message, key 225 provides a return to the main menu, key 226 deletes the message.

In the case of the voice messaging service of FIG. 2b, the dynamic configuration of the terminal 2 according to the third proposal results, as illustrated in FIG. 4b, in a terminal 2 whose touchscreen 22 allows access to the messaging functions. The browsing by touching the screen 22 allows for travel in all directions, the messages being presented in tabular form.

FIG. 6 illustrates an architecture implementing an embodiment of the invention. Means for delivery of a service 1 and in particular sending means 1201 of negotiation means 12 send a set p of interaction proposals to a terminal 2, in particular to an interaction interface 22. Reception means 2201 receive this set p and decision means 2202 accept one or more of the proposals according to the default configuration, the customized configuration, the profile, etc. An indication of acceptance of a proposal c is received by the reception means 1202 of the negotiation means, which confirms the interaction proposal accepted by the terminal 2.

When a corresponding service session ss sv is set up by the processing means (processor) 13 of the means for delivery of the service and the processing means (processor) 23 of the terminal, the configuration means of the terminal 2203 dynamically configure the terminal according to the accepted interaction proposal(s) c.

The means for delivery of a service 1 may be remote from a terminal, notably in an application server, or local, that is to say implemented in the terminal 2 (not illustrated). The connectivity between the means for delivery of the service and the terminal covers all types: wired, wireless, GSM, Bluetooth, Wifi, Ethernet, or even a simple application relationship between two software components, etc.

In a variant of the invention, the configuration method complements the existing mechanisms enabling a terminal to communicate its information playback capabilities (screen size, etc.) to an application server.

In a variant of the invention, the means for delivery of the service 1 exploit the information supplied to it by the negotiation method to adapt the way in which it interacts with the terminal 2. In the case of architectures such as the three-tier web architectures for example, the interaction will be, notably, taken over by the "Presentation" layer. In this way, the "Service logic" layer, also called "Application" layer, can be used to deliver the service agnostically to the terminal; the "Presentation" layer taking over the interaction with the terminal.

In some applications, some elements may act as relays, that is to say that they implement both the terminal 2 for a first service and the means for delivery of a second service 1, such as a television receiver which acts both as means for delivery of a second service with respect to the remote control and as a terminal accessing a first service: television service located on the network.

By virtue of an embodiment of the invention, the developer of the service does not have to have a priori knowledge of the terminals that will be used to access his service since the terminal and the means for delivery of the service will dialogue using the negotiation method enabling the terminal to dynamically adapt its configuration. Furthermore, the user can make best use of his or her terminal according to the interfaces of the terminal and the set of interaction proposals of the means for delivery of the service.

By customizing the configuration in relation to the users' constraints: mobility, meeting, handicap, the interaction of the terminal with the service will also be adapted to the user of the terminal, and for any service.

The services targeted by an embodiment of the invention correspond to any usage type (non-exhaustive list):

- access to centralized services, such as voice messaging, internet browsing, online gaming, online music, online TV, from mobile terminals;
- the use of a single remote control for various home automation appliances, such as the TV, the Freeview receiver, the set-top box, the hi-fi system, a multimedia centre, etc.;
- use of any type of terminal (Bluetooth telephone, joystick with advanced functions, etc.) as remote control for miscellaneous appliances;
- use of any type of terminal to act as interaction interface with varied services: settings on a car, GPS navigation, etc.;
- use of any type of terminal to act as interaction interface with public kiosks in order, notably, to purchase train tickets, event seats, subway tickets, parking places, hotel and restaurant bookings; etc.
- use of the electronic joystick of a wheelchair of a user as interaction interface with any service.

The negotiation method and the configuration method constitutes a protocol which can be implemented in the form of an application programming interface or API enabling the means for delivery of a service to dialogue with the terminal on which they are installed to discover the interaction capabilities thereof. For example, for the downloading of applications to mobile telephones, each application embeds this API which enables it to exchange with the mobile to know which stimuli it can take over. Thus, the application can support a large number of mobiles without having to know them all.

Although the present disclosure has been described with reference to one or more examples, workers skilled in the art will recognize that changes may be made in form and detail without departing from the scope of the disclosure and/or the appended claims.

The invention claimed is:

1. A negotiation method for delivery of a service to a terminal comprising:

sending from a delivery component configured for delivery of said service to said terminal a set of proposals for interactions taken over by the delivery component when delivering said service, the set of proposals being configured to enable said terminal to indicate to said delivery component that said terminal is able to take over at least one proposal from the set of interaction proposals, wherein each proposal of the set describes a list of at least two stimuli that are taken over by the delivery component for delivery of the service to the terminal during a service session, wherein the list of at least two stimuli for each proposal describes a list of interaction commands that have to be sent by the terminal to the delivery component when corresponding interactions are activated by the user through an interaction interface of the terminal, wherein each list of stimuli is different than the lists of stimuli of the other proposals and corresponds to a respective configuration of the interaction interface of the terminal, wherein the delivery component and the terminal are distinct devices, and the act of sending comprises transmitting the set of proposals from the delivery component to the terminal; and receiving at the delivery component an indication from said terminal that said terminal takes over the at least one proposal from the set of interaction proposals, wherein the delivery component is configured to accept an indication comprising more than one of the proposals in the set, the at least one proposal being selected based at least in part on capabilities of the terminal, said delivery component using said received indication to configure itself for delivering said service to said terminal according to the corresponding interaction commands of the at least one proposal.

2. The negotiation method as claimed in claim 1, wherein sending a set of proposals for interactions is repeated during the session of said service.

3. The negotiation method of claim 1 further comprising adapting interactions that deliver services to the terminal in response to the at least one proposal taken over by the terminal.

4. A non-transitory computer-readable medium comprising a program stored thereon and comprising program code instructions for executing a method of negotiating delivery of a service to a terminal, when said program is executed by a processor, wherein the method comprises:

sending from a delivery component configured for delivery of said service to said terminal a set of proposals for interactions taken over by the delivery component when delivering said service, the set of proposals being configured to enable said terminal to indicate to said delivery component that said terminal is able to take over at least one proposal from the set of interaction proposals, wherein each proposal of the set describes a list of at least two stimuli that are taken over by the delivery component for delivery of the service to the terminal during a service session, wherein the list of at least two stimuli for each proposal describes a list of interaction commands that have to be sent by the terminal to the delivery component when corresponding interactions are activated by the user through an interaction interface of the terminal, wherein each list of stimuli is different than the lists of stimuli of the other proposals and corresponds to a respective configuration of the interaction interface of the terminal, wherein the delivery component and the terminal are distinct devices, and the act of sending comprises transmitting the set of proposals from the delivery component to the terminal; and receiving at the delivery component an indication from said terminal that said terminal takes over the at least one proposal from the set of interaction proposals, wherein the delivery component is configured to accept an indication comprising more than one of the proposals in the set, the at least one proposal being selected based at least in part on capabilities of the terminal, said delivery component using said received indication to configure itself for delivering said service to said terminal according to the corresponding interaction commands of the at least one proposal.

5. A server delivering a service to a terminal, the server comprising:

a delivery component configured for delivery of said service;

a processor configured to send from the delivery component to said terminal a set of proposals for interactions taken over by the delivery component when delivering said service, the set of proposals being configured to enable said terminal to indicate to the server that said terminal is able to take over at least one proposal from the set of interaction proposals, wherein each proposal of the set describes a list of at least two stimuli that are taken over by the delivery component for delivery of the service to the terminal during a service session, wherein the list of at least two stimuli for each proposal describes a list of interaction commands that have to be sent by the terminal to the delivery component when corresponding interactions are activated by the user through an interaction interface of the terminal, and wherein each list of stimuli is different than the lists of stimuli of the other proposals and corresponds to a respective configuration of the interaction interface of the terminal, the terminal being permitted to accept more than one of the proposals in the set; and the processor further being configured to receive an indication from said terminal that said terminal takes over the at least one proposal from the set of interaction proposals, the at least one proposal being selected based at least in part on capabilities of the terminal, said delivery component using said received indication to configure itself for delivering said service to said terminal according to the corresponding interaction commands of the at least one proposal.

6. A method for configuring a terminal with a view to the delivery of a service comprising:

receiving at the terminal, from a delivery component configured for delivery of said service, a set of proposals for interactions taken over by the delivery component when delivering said service, wherein each proposal of the set describes a list of at least two stimuli that are taken over by the delivery component for delivery of the service to the terminal during a service session, wherein the list of at least two stimuli for each proposal describes a list of interaction commands that have to be sent by the terminal to the delivery component when corresponding interactions are activated by the user through an interaction interface of the terminal, wherein each list of stimuli is different than the lists of stimuli of the other proposals and corresponds to a respective configuration of the interaction interface of the terminal, wherein the delivery component and the terminal are distinct devices, selecting the at least one proposal based at least in part on capabilities of the terminal, and sending from the terminal an indication to said delivery component that said terminal takes over the selected at least one proposal from the set of interaction proposals, wherein the terminal is configured to enable the indication to accept more than one of the proposals in the set, said terminal using said at least one proposal to configure itself for delivery of said service from said delivery component according to the corresponding interaction commands of the at least one proposal.

7. The configuration method as claimed in claim 6, wherein said method comprises repeating the receiving a set of interaction proposals capable of enabling said terminal to modify the at least one proposal taken over by the terminal.

8. A non-transitory computer-readable medium comprising a program stored thereon and comprising program code instructions for executing steps of configuring a terminal with a view to the delivery of a service when said program is executed by a processor, wherein the method comprises:

receiving at the terminal, from a delivery component configured for delivery of said service, a set of proposals for interactions taken over by the delivery component when delivering said service, wherein each proposal of the set describes a list of at least two stimuli that are taken over by the delivery component for delivery of the service to the terminal during a service session, wherein the list of at least two stimuli for each proposal describes a list of interaction commands that have to be sent by the terminal to the delivery component when corresponding interactions are activated by the user through an interaction interface of the terminal, wherein each list of stimuli is different than the lists of stimuli of the other proposals and corresponds to a respective configuration of the interaction interface of the terminal, wherein the delivery component and the terminal are distinct devices, selecting at least one proposal based at least in part on capabilities of the terminal, and sending from the terminal an indication to said delivery component that said terminal takes over the selected at least one proposal from the set of interaction proposals, wherein the terminal is configured to enable the indication to accept more than one of the proposals in the set, said terminal using said at least one proposal to configure the terminal for delivery of said service from said delivery component according to the corresponding interaction commands of the at least one proposal.

9. A terminal comprising:

a memory;

a processor configured to receive from a delivery component configured for delivery of a service a set of proposals for interactions taken over by a delivery component when delivering the service, wherein each proposal of the set describes a list of at least two stimuli that are taken over by the delivery component for delivery of the service to the terminal during a service session, wherein the list of at least two stimuli for each proposal describes a list of interaction commands that have to be sent by the terminal to the delivery component when corresponding interactions are activated by the user through an interaction interface of the terminal, wherein each list of stimuli is different than the lists of stimuli of the other proposals and corresponds to a respective configuration of the interaction interface of the terminal, wherein the delivery component and the terminal are distinct devices, and wherein the processor is further configured to select at least one proposal of the set based at least in part on capabilities of the terminal, to provide an indication to said delivery component that said terminal takes over the selected at least one proposal from the set of interaction proposals and to use said at least one proposal to configure the terminal for delivery of said service from said delivery component according to the corresponding interaction commands of the at least one proposal, wherein the terminal is configured to enable the indication to accept more than one of the proposals in the set.

* * * * *